United States Patent
Graham et al.

(10) Patent No.: US 6,952,597 B2
(45) Date of Patent: Oct. 4, 2005

(54) WIRELESS MOBILE PHONE WITH KEY STROKING BASED INPUT FACILITIES

(75) Inventors: Tyrol R. Graham, Seattle, WA (US); G. Eric Engstrom, Kirkland, WA (US)

(73) Assignee: Wildseed Ltd., Kirkland, WA (US)

( * ) Notice: Subject to any disclaimer, the term of this patent is extended or adjusted under 35 U.S.C. 154(b) by 374 days.

(21) Appl. No.: 09/767,197

(22) Filed: Jan. 22, 2001

(65) Prior Publication Data

US 2002/0137550 A1 Sep. 26, 2002

(51) Int. Cl.$^7$ ................................................. H04M 1/00
(52) U.S. Cl. ................... 455/566; 455/550.1; 455/90.3; 345/169; 345/173
(58) Field of Search ................................. 455/566, 414, 455/425, 550, 90, 550.1, 575.1; 345/173, 169, 901; 379/93.18, 93.27; 341/28

(56) References Cited

U.S. PATENT DOCUMENTS 5,945,928 A * 8/1999 Kushler et al. ............... 341/28
5,982,303 A * 11/1999 Smith ....................... 379/93.18
6,107,997 A * 8/2000 Ure ............................. 345/156
6,295,052 B1 * 9/2001 Kato et al. ................... 345/173
6,297,945 B1 * 10/2001 Yamamoto ................... 455/450
6,310,609 B1 * 10/2001 Morgenthaler ............... 345/170

FOREIGN PATENT DOCUMENTS

WO          WO 97/41677     * 11/1997     ............ H04M/1/02

* cited by examiner

*Primary Examiner*—Sonny Trinh
(74) *Attorney, Agent, or Firm*—Schwabe, Williamson & Wyatt, P.C.

(57) ABSTRACT

A wireless mobile phone, is provided with an input keypad having a number of touch sensitive keys, and complementary logic to facilitate entry of alphanumeric data through stroking of the touch sensitive keys of the input keypad. Alphanumeric data or commands are entered through selected ones of down, up, right, left, and a number of other patterns of stroking of the touch sensitive keys. As a result, a user may enter alphanumeric data or commands in a much more user friendly manner.

47 Claims, 23 Drawing Sheets

300

Stroke Down ⇩

| ▼[1] | 2 | 3 |
|---|---|---|
| 4 | 5 | 6 |
| 7 | 8 | 9 |
| * | 0 | # |

| 1 | ▼[2] | 3 |
|---|---|---|
| 4 | 5 | 6 |
| 7 | 8 | 9 |
| * | 0 | # |

| 1 | 2 | [3]▼ |
|---|---|---|
| 4 | 5 | 6 |
| 7 | 8 | 9 |
| * | 0 | # |

| [1 | 2 | 3 |
|---|---|---|
| ▼4] | 5 | 6 |
| 7 | 8 | 9 |
| * | 0 | # |

| 1 | [2 | 3 |
|---|---|---|
| 4 | 5]▼ | 6 |
| 7 | 8 | 9 |
| * | 0 | # |

| 1 | 2 | [3 |
|---|---|---|
| 4 | 5 | 6]▼ |
| 7 | 8 | 9 |
| * | 0 | # |

| [1 | 2 | 3 |
|---|---|---|
| 4 | 5 | 6 |
| 7] | 8 | 9 |
| * | 0 | # |

| 1 | [2 | 3 |
|---|---|---|
| 4 | 5 | 6 |
| 7 | 8]▼ | 9 |
| * | 0 | # |

| 1 | 2 | [3 |
|---|---|---|
| 4 | 5 | 6 |
| 7 | 8 | 9]▼ |
| * | 0 | # |

| [1 | 2 | 3 |
|---|---|---|
| 4 | 5 | 6 |
| 7 | 8 | 9 |
| *]▼ | 0 | # |

| 1 | [2 | 3 |
|---|---|---|
| 4 | 5 | 6 |
| 7 | 8 | 9 |
| * | 0]▼ | # |

| 1 | 2 | [3 |
|---|---|---|
| 4 | 5 | 6 |
| 7 | 8 | 9 |
| * | 0 | #]▼ |

Others: *[4, 7], [5, 8], [6, 9]*
*[7, \*], [8, 0], [9, #]*
*[4, 7, \*], [5, 8, 0], [6, 9, #]*

Figure 4a

Stroke Up ⇧

| 1 | 2 | 3 |
|---|---|---|
| 4 | 5 | 6 |
| 7 | 8 | 9 |
| *[*]* | 0 | # |

| 1 | 2 | 3 |
|---|---|---|
| 4 | 5 | 6 |
| 7 | 8 | 9 |
| * | *[0]* | # |

| 1 | 2 | 3 |
|---|---|---|
| 4 | 5 | 6 |
| 7 | 8 | 9 |
| * | 0 | *[#]* |

| 1 | 2 | 3 |
|---|---|---|
| 4 | 5 | 6 |
| *[7* | 8 | 9 |
| *]* | 0 | # |

| 1 | 2 | 3 |
|---|---|---|
| 4 | 5 | 6 |
| 7 | *[8* | 9 |
| * | *0]* | # |

| 1 | 2 | 3 |
|---|---|---|
| 4 | 5 | 6 |
| 7 | 8 | *[9* |
| * | 0 | *#]* |

| 1 | 2 | 3 |
|---|---|---|
| *[4* | 5 | 6 |
| *7* | 8 | 9 |
| **]* | 0 | # |

| 1 | 2 | 3 |
|---|---|---|
| 4 | *[5* | 6 |
| 7 | *8* | 9 |
| * | *0]* | # |

| 1 | 2 | 3 |
|---|---|---|
| 4 | 5 | *[6* |
| 7 | 8 | *9* |
| * | 0 | *#]* |

| *[1* | 2 | 3 |
|---|---|---|
| *4* | 5 | 6 |
| *7* | 8 | 9 |
| **]* | 0 | # |

| 1 | *[2* | 3 |
|---|---|---|
| 4 | *5* | 6 |
| 7 | *8* | 9 |
| * | *0]* | # |

| 1 | 2 | *[3* |
|---|---|---|
| 4 | 5 | *6* |
| 7 | 8 | *9* |
| * | 0 | *#]* |

Figure 4b

Others: *[7, 4]*, *[8, 5]*, *[9, 6]*
*[4, 1]*, *[5, 2]*, *[6, 3]*
*[7, 4, 1]*, *[8, 5, 2]*, *[9, 6, 3]*

Stroke Right

Stroke Down & Left

Others: *[9, #, 0], [9, #, 0, *], [5, 8, 7], [5, 8, 0, *] [8, 0, *]*

Stroke Up and Right

Others: [4, 1, 2], [4, 1, 2, 3]
[8, 5, 6], [8, 5, 2, 3], [5, 2, 3]

Stroke Up and Left

Others: [8, 5, 4], [8, 5, 2, 1]
[6, 3, 2], [6, 3, 2, 1], [5, 2, 1]

Stroke Left and Down

Others: *[2, 1, 4, 7], [2, 1, 4, 7, \*]*
*[5, 4, 7], [5, 4, 7, \*], [8, 7, \*]*

Stroke Right and Down

Others: *[2, 3, 6, 9], [2, 3, 6, 9, #], [5, 6, 9], [5, 6, 9, #], [8, 9, #]*

Others: *[0, \*, 7, 4], [0, \*, 7, 4, 1], [8, 7, 4], [8, 7, 4, 1], [5, 4, 1]*

Stroke Right and Up

Others: *[4, 5, 2], [4, 5, 6, 3], [8, 9, 6], [8, 9, 6, 3], [5, 6, 3]*

Figure 4m    Stroke Diagonal, 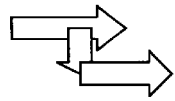
Top to Bottom, and
Left to Right

Stroke Diagonal,
Top to Bottom, and
Right to Left

Figure 4o  Stroke Diagonal, Bottom to Top, and Left to Right 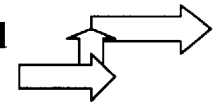

Stroke Diagonal, Bottom to Top, and Right to Left

500

| Stroking Direction | Keys Stroked | | | | | | Total Patterns |
|---|---|---|---|---|---|---|---|
| | 1 | 2 | 3 | 4 | 5 | 6 | |
| Down | 3 | 9 | 6 | 3 | | | 21 |
| Up | 3 | 9 | 6 | 3 | | | 21 |
| Right | | 8 | 4 | | | | 12 |
| Left | | 8 | 4 | | | | 12 |
| Down Right | | | 6 | 7 | 4 | 1 | 18 |
| Down Left | | | 6 | 7 | 4 | 1 | 18 |
| Up Right | | | 6 | 7 | 4 | 1 | 18 |
| Up Left | | | 6 | 7 | 4 | 1 | 18 |
| Left Down | | | 6 | 7 | 4 | 1 | 18 |
| Right Down | | | 6 | 7 | 4 | 1 | 18 |
| Left Up | | | 6 | 7 | 4 | 1 | 18 |
| Right Up | | | 6 | 7 | 4 | 1 | 18 |
| DTBLR | | | | 3 | 2 | 1 | 6 |
| DTBRL | | | | 3 | 2 | 1 | 6 |
| DBTLR | | | | 3 | 2 | 1 | 6 |
| DBTRL | | | | 3 | 2 | 1 | 6 |
| Total Patterns | 6 | 34 | 68 | 74 | 40 | 12 | 234 |

Figure 5

WIRELESS MOBILE PHONE WITH KEY STROKING BASED INPUT FACILITIES

BACKGROUND OF THE INVENTION

1. Field of the Invention

The present invention relates to the field of wireless mobile phones. More specifically, the present invention relates to the data entry features of these devices.

2. Background Information

Advances in integrated circuit and telecommunication technology have led to wide spread adoption of wireless mobile client devices, in particular, wireless mobile telephones. Wireless mobile phones offer the advantage of enabling their users to be communicatively reachable by their business associates, friends and family members, wherever the users may be, as long as they are within the reach of the service networks. Thus, even non-professionals are increasingly dependent on their wireless mobile phones to meet their communication needs.

Many late model mobile phones also include a wide variety of ancillary functions, including but not limited to calendar, games, emails, web browsing, and so forth. Thus, users of wireless mobile phones, especially the late models, increasingly find themselves having to enter alphanumeric data. However, as those skilled in the art would appreciate, most mobile phones, because of space limitations, merely include a 12-key "numeric" keypad. Entry of alphabets require well timed pressing of the "numeric" keys. A quick press of the "2" key followed by a pause is necessary to enter the letter "a", a quick double press of the "2" key followed by a pause is required to enter the letter "b", and so forth. Thus, alphanumeric data entry under the prior art is cumbersome, and not user friendly.

Accordingly, a more user friendly approach to facilitating alphanumeric data entry into a wireless mobile phone, is desired.

Note: The term "wireless mobile phone" as used in herein (in the specification and in the claims) refers to the class of telephone devices equipped to enable a user to make and receive calls wirelessly, notwithstanding the user's movement, as long as the user is within the communication reach of a service or base station. The term "wireless mobile phone" is to include the analog subclass as well as the digital subclass (of all signaling protocols).

SUMMARY OF THE INVENTION

A wireless mobile phone, is provided with an input keypad having a number of touch sensitive keys, and complementary logic to facilitate entry of alphanumeric data by stroking the touch sensitive keys of the input keypad. Alphanumeric data or commands (including menu selections) are entered through selected ones of down, up, right, left, and a number of other patterns of stroking the touch sensitive keys. As a result, a user may enter alphanumeric data or commands (including menu selections) in a much more user friendly manner.

In one embodiment, the complementary logic further facilitates echoing on a display, alphanumeric data corresponding to the stroking patterns imparted. Additionally, the touch sensitive keys include light emitting diodes (LEDs), and the LEDs are lit to visually echo the stroking patterns being imparted.

BRIEF DESCRIPTION OF DRAWINGS

The present invention will be described by way of exemplary embodiments, but not limitations, illustrated in the accompanying drawings in which like references denote similar elements, and in which:

FIG. 5 summarizes the number of key stroking patterns recognized under each of the stroking directions illustrated by FIGS. 4a–4p.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention. The phrase "in one embodiment" will be used repeatedly, however the phrase does not necessarily refer to the same embodiment, although it may.

Referring now to FIGS. 1a–1d, wherein four embodiments of a wireless mobile phone, incorporated with the teachings of the present invention are shown. As illustrated, in accordance with the present invention, wireless mobile phone 100/100'/100"/100''' is provided with an input keypad 102/102'/102"/102''' having touch sensitive keys, and complementary logic (shown as ref. 330 in FIG. 3) to facilitate a user of phone 100/100'/100"/100''' to enter alphanumeric data, e.g. a name search criteria, a text message to be transmitted, or a command, through stroking patterns imparted on the touch sensitive keys of keypad 102/102'/102"/102'''. That is, various alphabets, punctuations, as well as commands are assigned corresponding key stroking patterns, and whenever the assigned key stroking pattern is imparted by a user, the corresponding alphabet, punctuation or command is deemed to have been entered by the user, and generated internally accordingly.

The "keys" of keypad 102/102'/102"/102''' are touch sensitive in the sense that the complementary logic is able to discern a user's stroking or gliding pattern over the "keys" (with his/her thumb or other fingers), without requiring the user to depress the keys. For examples, the complementary logic is able to discern the user stroking or gliding over keys [1, 4] in a downward direction, [0, 8] in an upward direction, [1, 2, 3] in a rightward direction, [9, 8, 7] in a leftward direction, and so forth.

Note that all directional movements are objectively determined with the layout of the keypad as reference. Movement of a user's finger from a key of row [1, 2, 3] towards another key of the same column of row [*, 0, #] is moving in a downward direction, while movement in the reverse direction is moving in an upward direction. Movement of a user's finger from a key of column [1, 4, 7, *] towards another key of the same row of column [3, 6, 9, #] is moving in a rightward direction, while movement in the reverse direction is moving in a leftward direction.

Figure 1A:
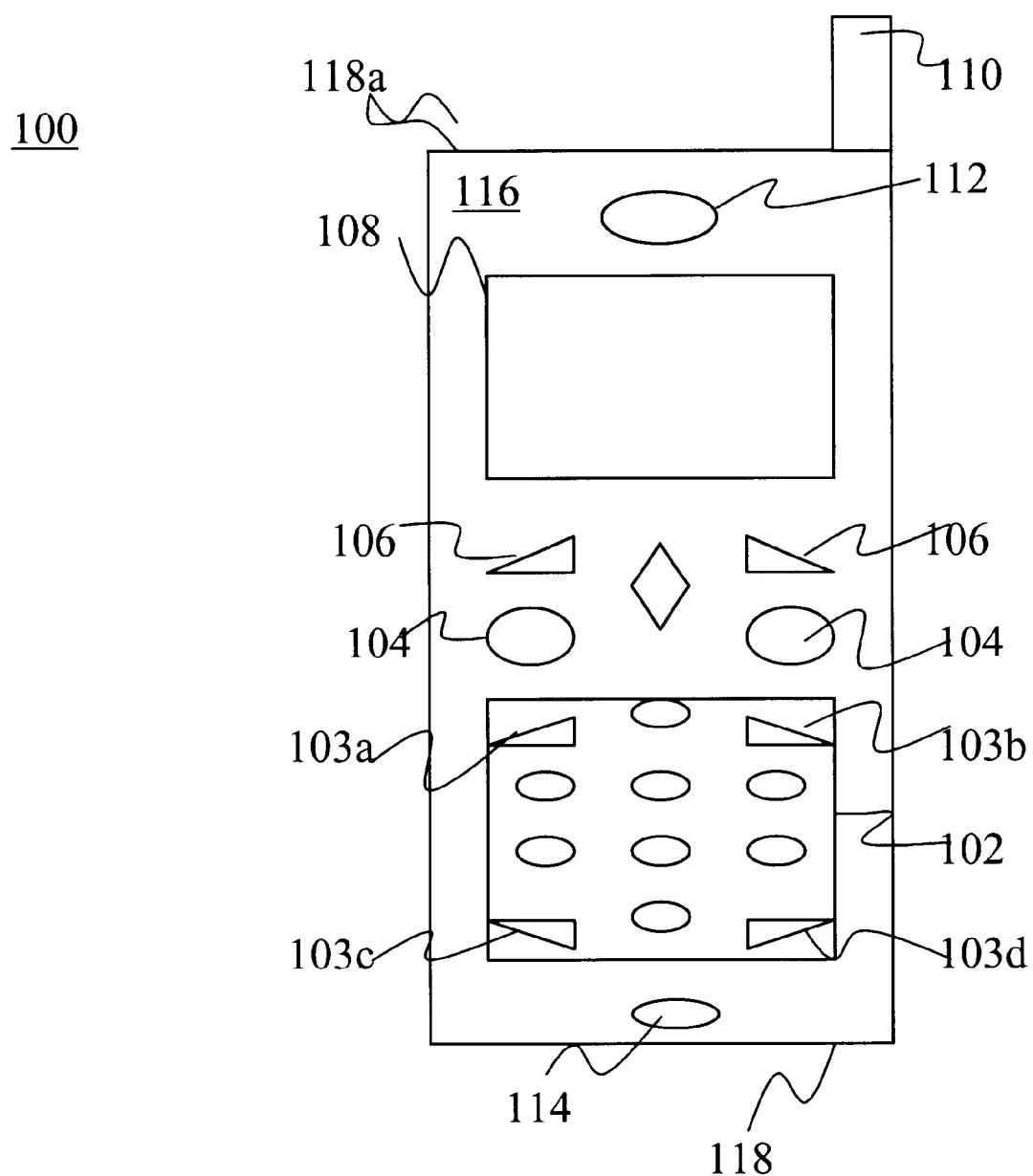
FIGS. 1a–1b illustrate a wireless mobile phone of the present invention, having incorporated with the key stroking based data entry facilities of the present invention, in accordance with two embodiments.
Figure 1B:
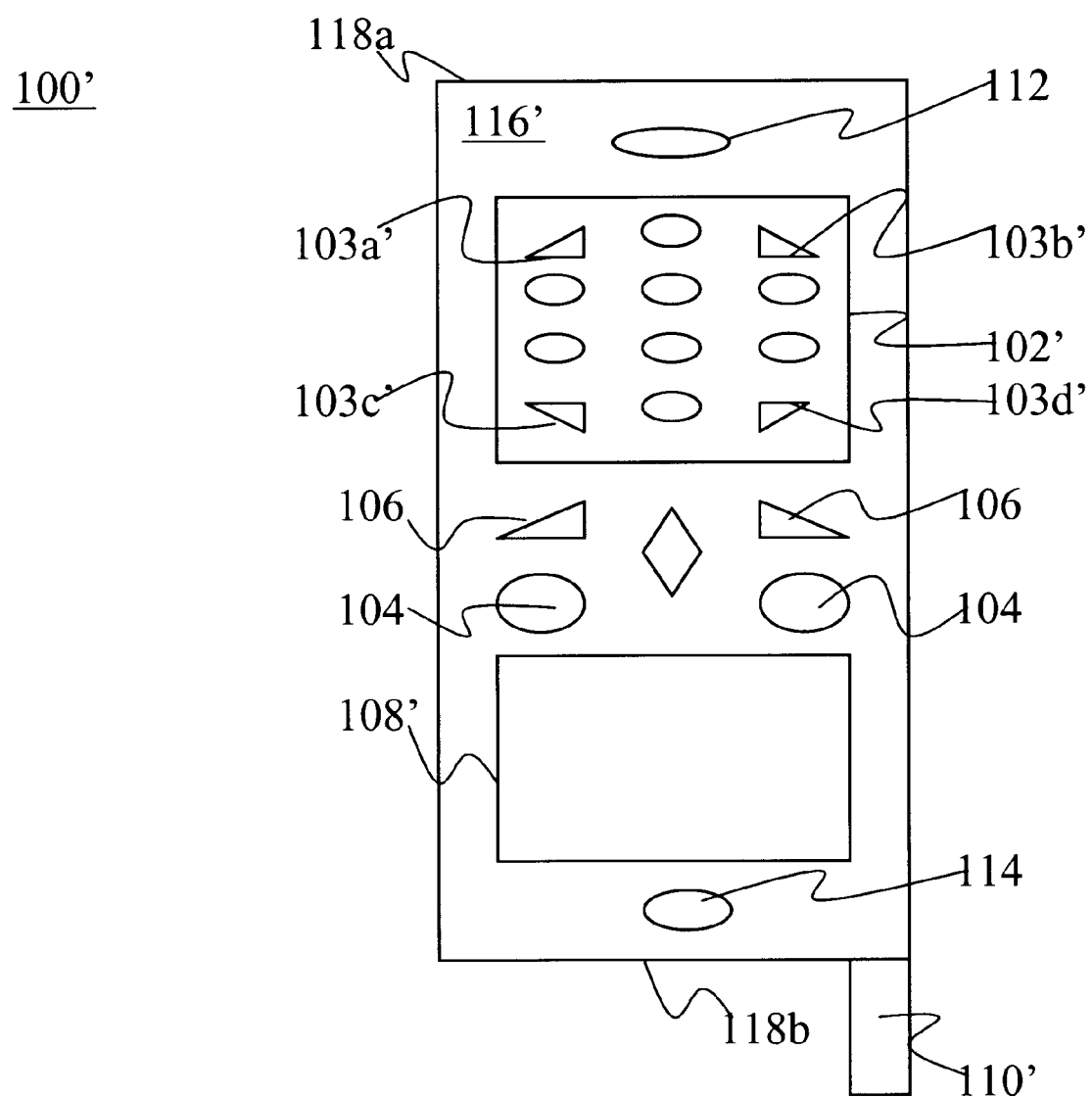

In the embodiments of FIGS. 1a–1b, each of keypads 102 and 102' includes a plurality of actual physical keys. These physical keys may be made touch sensitive using anyone of a number of touch sensitive techniques known in the art, e.g. via embedded capacitors. For the illustrated embodiments, in addition to being touch sensitive, keys of different geometric shapes, or different surface smoothness, or other different attributes, are employed as corner keys, keys 103a–103d/103a'–103d', to enable a user to have a better feel of his/her thumb or other fingers' position on input keypad 102/102' when imparting a stroking pattern. Further, keys of keypad 102/102' are provided with light emitting diodes (LED). The LEDs are employed to provide feedback to the user with respect to the stroking pattern being imparted. That is, the LEDs of the keys being stroked or glided over by the user are lit.

Figure 1C:
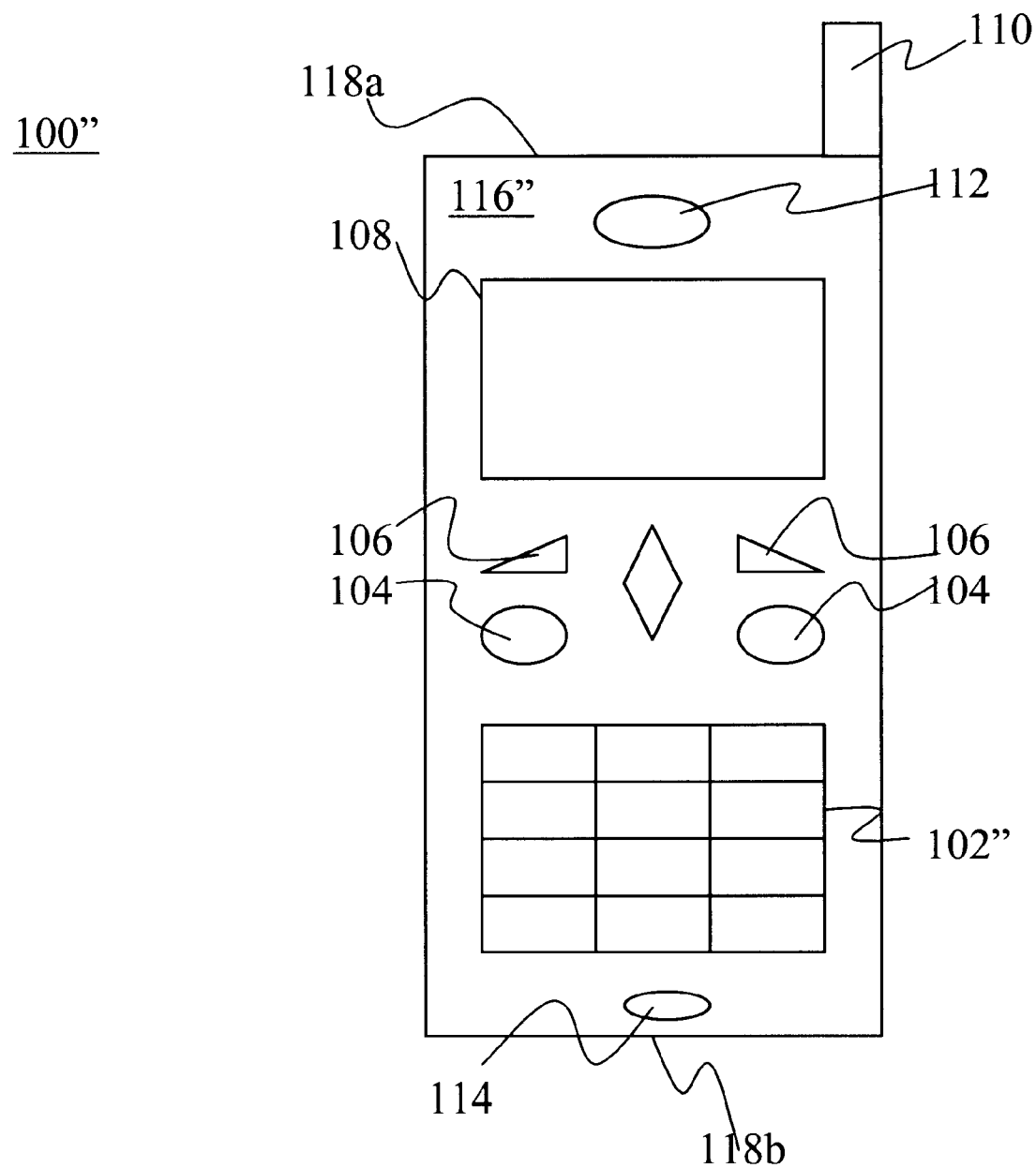
FIGS. 1c–1d illustrate two additional alternate embodiments to the wireless mobile phones of FIGS. 1a–1b.
Figure 1D:
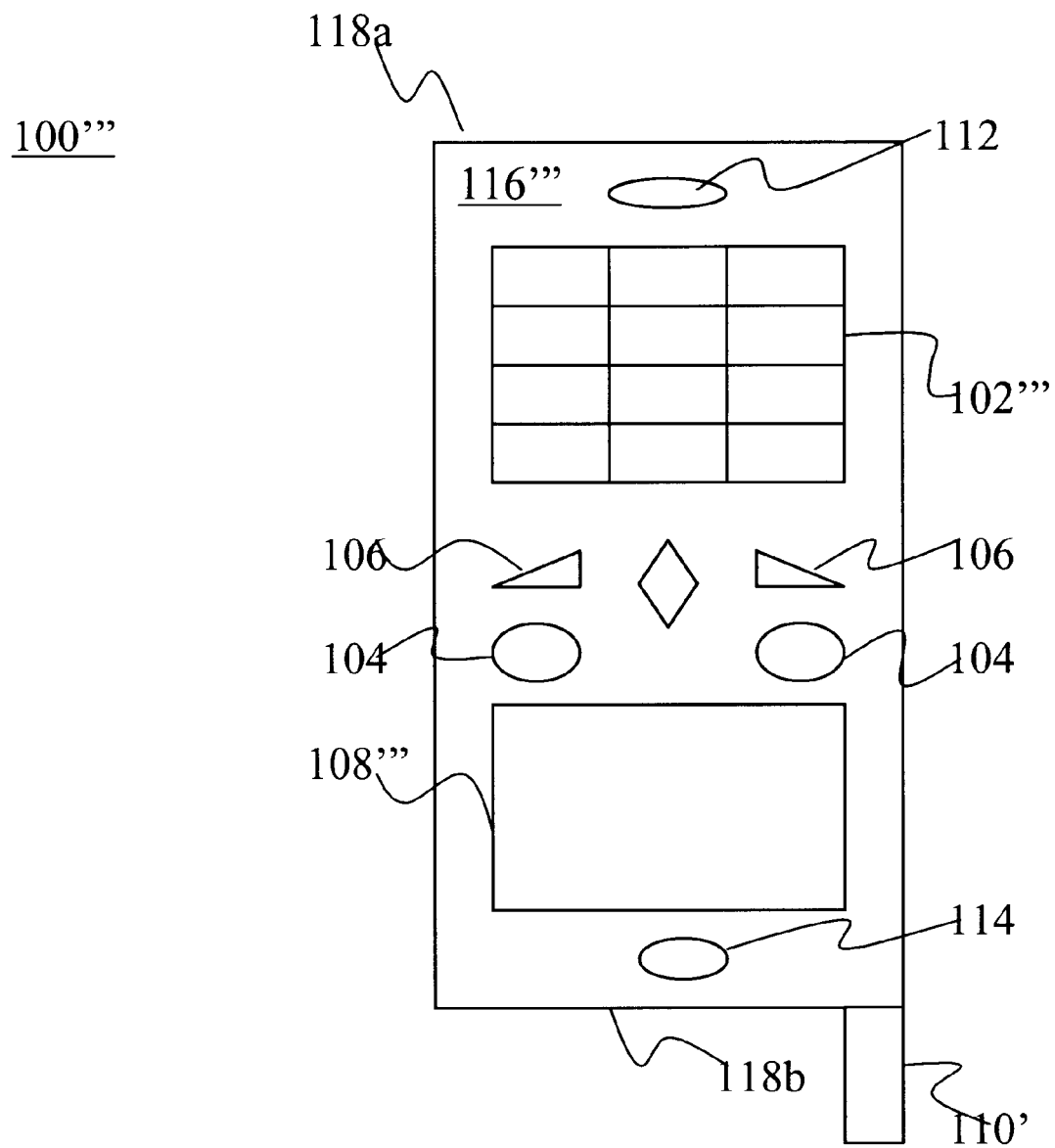

In the embodiments of FIGS. 1c–1d, input keypads 102" and 102''' are formed using touch pads. That is, each of key pads 102" and 102''' are logically partitioned into e.g. at least twelve regions, and the logically partitioned regions are correspondingly assigned to represent the conventional "buttons" or "keys" [1, 2, 3], [4, 5, 6], [7, 8, 9], [*, 0, #] (going left to right and top to bottom). Numeric entries and entry of the symbols * and # are effectuated by "tapping" the corresponding regions or "keys". Thus, unless the context requires otherwise, in general, the term "key" as used hereafter (including in the claims) include "real" physical keys (as those of the embodiments of FIGS. 1a–1b) and "soft" keys (as those of the embodiments of FIGS. 1c–1d). Beside touch sensitive keypad 102/102'/102"/102''' and the complementary logic, mobile phone 100/100'/100"/100''' is otherwise intended to represent a broad range of mobile phones known in the art. In addition to touch sensitive keypad 102/102'/102"/102''' and the complementary logic, mobile phone 100/100'/100"/100''' further includes, "talk" and "end talk" buttons 104, cursor control buttons 106, display screen 108/108', antenna 110/110', ear speaker 112 and microphone 114. Mobile phone 100/100'/100"/100''' also includes body casing 116/116' with top end 118a and bottom end 118b.

The embodiments of FIGS. 1a and 1c differ from the embodiments of FIGS. 1b and 1d in the relative disposition of antenna 110/110' to ear speaker 112, and the relative disposition of keypad 102/102'/102"/102''' to display 108/108'. In the embodiments of FIGS. 1a and 1c, similar to conventional prior art mobile phones, antenna 110 and ear speaker 112 are both disposed near top end 118a, whereas in the embodiments of FIGS. 1b and 1d, unlike conventional prior art mobile phones, antenna 110' is disposed near bottom end 118b while ear speaker 112 is disposed near top end 118a. In the embodiments of FIGS. 1a–1c, similar to conventional prior art mobile phones, keypad 102/102" is disposed in the lower half of phone 100/100" beneath display 108, whereas in the embodiments of FIGS. 1b–1d, unlike conventional prior art mobile phones, keypad 102'/102''' is disposed in the upper half of phone 100'/100''' above display 108. Disposition of antenna 110' near bottom end 118b, and disposition of display 108' beneath keypad 102'/102''', are the subject matters of co-pending application Ser. No. 09/767,526, contemporaneously filed herewith, entitled "A Wireless Mobile Phone with Inverted Placement of Antenna and Input Keypad", which is hereby fully incorporated by reference.

Figure 4C:
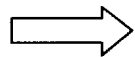
FIGS. 4a–4p illustrate the various key stroking patterns that may be recognized under various stroking directions to facilitate data entry.
Figure 4D:
Figure 4E:
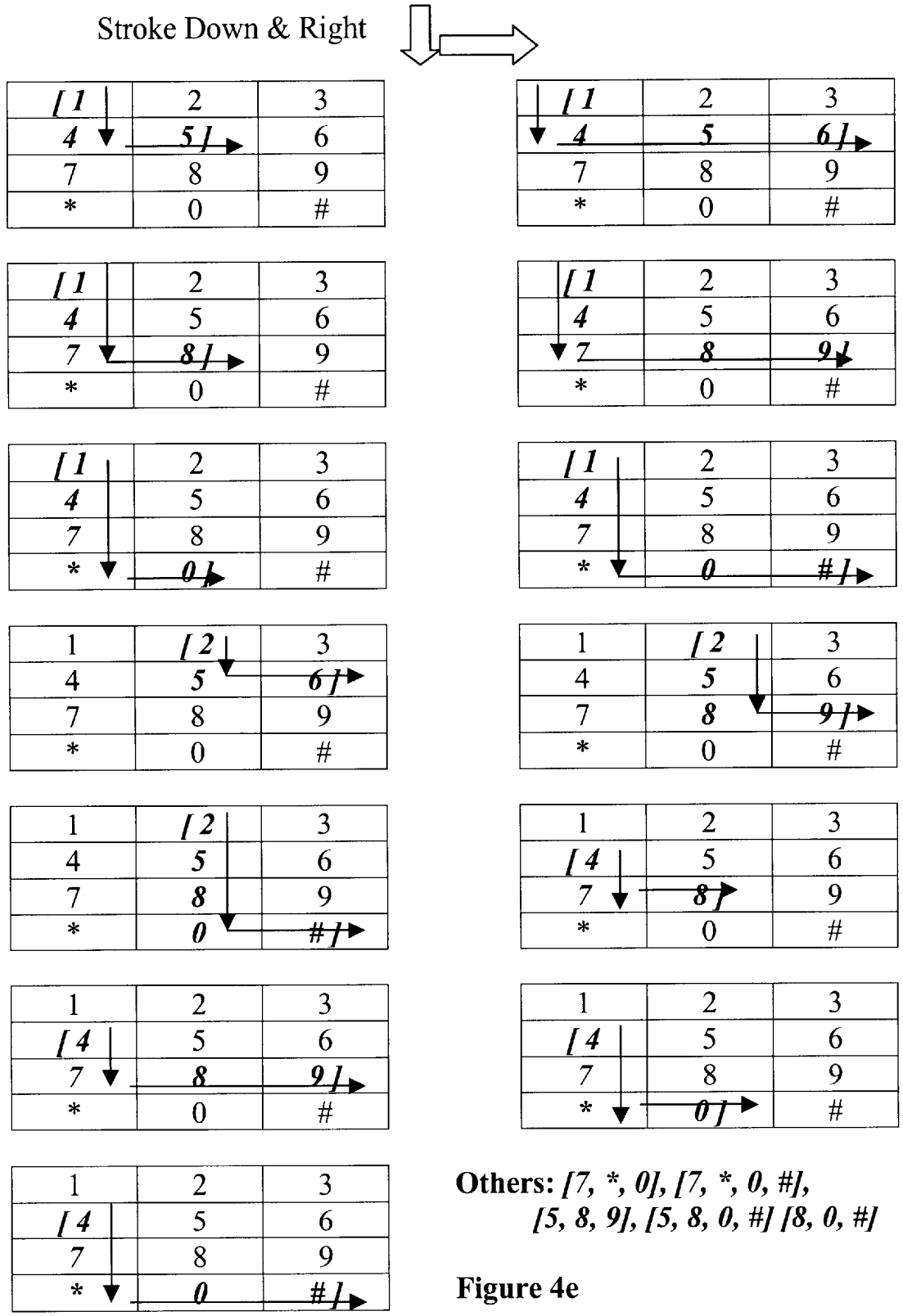
Figure 4F:
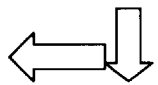
Figure 4G:
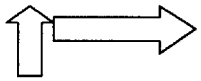
Figure 4H:
Figure 4I:
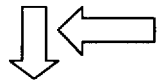
Figure 4J:
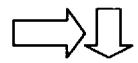
Figure 4K:
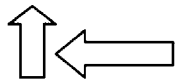
Figure 4L:
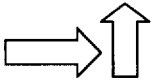
Figure 4N:
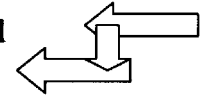
Figure 4P:
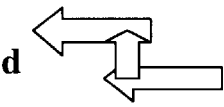

FIGS. 4a–4p illustrate hundreds of key stroking or gliding patterns under various stroking directions, recognized by one embodiment of the present invention. FIG. 4a illustrates the key stroking patterns recognized under a downward stroking direction. As illustrated, the recognized downward key stroking patterns include [1], [2], [3], [1, 4], [2, 5], [3, 6], [1, 4, 7], and so forth. A "down" row of table 500 of FIG. 5, a total of 21 downward key stroking patterns, 3 of length one, 9 of length two, 6 of length three, and 3 of length four are recognized. FIG. 4b illustrates the key stroking patterns recognized under an upward stroking direction. As illustrated, the recognized upward key stroking patterns include [*], [0], [#], [*, 7], [0, 8], [#, 9], [*, 7, 4], and so forth. As summarized in the "up" row of table 500 of FIG. 5, similarly, a total of 21 upward key stroking patterns, 3 of length one, 9 of length two, 6 of length three, and 3 of length four are recognized. In other words, the mere employment of two stroking directions is already sufficient to represent the 26 letters of the English alphabet, with 16 additional key stroking patterns available to represent selected number of punctuations and commands.

FIG. 4c illustrates the key stroking patterns recognized under a rightward stroking direction. As illustrated, the recognized rightward stroking patterns include [1, 2], [1, 2, 3], [2, 3], and so forth. As summarized in the "right" row of table 500 of FIG. 5, a total of 12 key stroking patterns, 8 of length two, and 4 of length three are recognized. Similarly, FIG. 4d illustrates the key stroking patterns recognized under a leftward stroking direction. As illustrated, the recognized leftward stroking patterns include [3, 2], [3, 2, 1], [2, 1], and so forth. As summarized in the "left" row of table 500 of FIG. 5, a total of 12 stroking patterns, 8 of length two, and 4 of length three are recognized.

FIGS. 4e and 4f illustrate the key stroking patterns recognized under a first down then right (down right) stroking direction, and a first down then left (down left) stroking direction. As illustrated, the recognized down right stroking patterns include [1, 4, 5], [1, 4, 5, 6], [1, 4, 7, 8], and so forth, whereas the recognized down left stroking patterns include [3, 6, 5], [3, 6, 5, 4], [3, 6, 9, 8], and so forth. As summarized in the "down right" and the "down left" rows of table 500 of FIG. 5, in each case, a total of 18 key stroking patterns, 6 of length three, 7 of length four, 4 of length five, and 1 of length six are recognized. Similarly, FIGS. 4g and 4h illustrate the key stroking patterns recognized under a first up then right (up right) stroking direction, and a first up then left (up left) stroking direction. As illustrated, the recognized up right stroking patterns include [*, 7, 8], [*, 7, 8, 9], [*, 7, 4, 5], and so forth, whereas the recognized up left stroking patterns include [#, 9, 8], [#, 9, 8, 7], [#, 9, 6, 5], and so forth. As summarized in the "up right" and the "up left" rows of table 500 of FIG. 5, in each case, a total of 18 stroking patterns, 6 of length three, 7 of length four, 4 of length five, and 1 of length six are recognized.

Thus, with the further employment of these additional six stroking directions, right, left, down right, down left, up right and up left, more than a hundred total alphabets, punctuations, commands and strings may be easily entered by a user.

FIGS. 4i and 4j illustrate the key stroking patterns recognized under a first left then down (left down) stroking direction, and a first right then down (right down) stroking direction. As illustrated, the recognized left down stroking patterns include [3, 2, 5], [3, 2, 5, 8], [3, 2, 1, 4], and so forth, whereas the recognized right down stroking patterns include [1, 2, 5], [1, 2, 5, 8], [1, 2, 3, 6], and so forth. As summarized in the "left down" and the "right down" rows of table 500 of FIG. 5, in each case, a total of 18 key stroking patterns, 6 of length three, 7 of length four, 4 of length five, and 1 of length six are recognized. Similarly, FIGS. 4k and 4l illustrate the key stroking patterns recognized under a first left then up (left up) stroking direction, and a first right then up (right up) stroking direction. As illustrated, the recognized left up stroking patterns include [#, 0, 8], [#, 0, 8, 5], [#0, *, 7], and so forth, whereas the recognized right up stroking patterns include [*, 0, 8], [*, 0, 8, 5], [*0, #, 9] and so forth. As summarized in the "left up" and the "right up" rows of table 500 of FIG. 5, in each case, a total of 18 key stroking patterns, 6 of length three, 7 of length four, 4 of length five, and 1 of length six are recognized.

FIGS. 4m and 4n illustrate the key stroking patterns recognized under a diagonal, top to bottom, left to right (DTBLR) stroking direction, and a diagonal, top to bottom, right to left (DTBRL) stroking direction. As illustrated, the recognized diagonal top to bottom, left to right, key stroking patterns include [1, 2, 5, 6], [1, 2, 5, 8, 9], and so forth, whereas the recognized diagonal, top to bottom, right to left key stroking patterns include [3, 2, 5, 4], [3, 2, 5, 8, 7], and so forth. As summarized in the "DTBLR" and the "DTBRL" rows of table 500 of FIG. 5, in each case, a total of 6 key stroking patterns, 3 of length four, 2 of length five, and 1 of length six are recognized. Similarly, FIGS. 4o and 4p illustrate the key stroking patterns recognized under a diagonal, bottom to top, left to right (DBTLR) stroking direction, and a diagonal, bottom to top, right to left (DTBRL) stroking direction. As illustrated, the recognized diagonal bottom to top, left to right, key stroking patterns include [*, 0, 8, 9], [*, 0, 8, 5, 6], and so forth, whereas the recognized diagonal, bottom to top, right to left key stroking patterns include [#, 0, 8, 7], [#, 0, 8, 5, 4], and so forth. As summarized in the "DBTLR" and the "DBTRL" rows of table 500 of FIG. 5, in each case, a total of 6 key stroking patterns, 3 of length four, 2 of length five, and 1 of length six are recognized.

Thus, with the further employment of these additional eight stroking directions, left down, right down, left up, right up, DTBLR, DTBRL, DBTLR, and DBTRL, as many as another hundred total commands and strings, totally over two hundred, may be easily entered by a user.

Tables I and II below illustrate one example assignment of some of the earlier described key stroking patterns to represent the 26 letters of the English alphabet and four punctuations.

TABLE I

Key Stroking Patterns for Letters

| Letters | Stroking Direction | Key Stroking Pattern |
|---|---|---|
| A | Down | [2] |
| B | Down | [2, 5] |
| C | Down | [2, 5, 8] |
| D | Down | [3] |
| E | Down | [3, 6] |
| F | Down | [3, 6, 9] |
| G | Up | [4, 1] |
| H | Down | [4, 7] |

TABLE I-continued

Key Stroking Patterns for Letters

| Letters | Stroking Direction | Key Stroking Pattern |
|---|---|---|
| I | Down | [4, 7, 1] |
| J | Up | [5, 2] |
| K | Down | [5, 8] |
| L | Down | [5, 8, 0] |
| M | Up | [6, 3] |
| N | Down | [6, 9] |
| O | Down | [6, 9, #] |
| P | Down | [7, *] |
| Q | Up | [7, 4] |
| R | Up | [7, 4, 1] |
| S | Right | [7, 8] |
| T | Down | [8, 0] |
| U | Up | [8, 5] |
| V | Up | [8, 5, 2] |
| W | Down | [9, #] |
| X | Up | [9, 6] |
| Y | Up | [9, 6, 3] |
| Z | Left | [9, 8] |

TABLE II

Key Stroking Patterns for Punctuations

| Punctuations | Stroking Direction | Key Stroking Pattern |
|---|---|---|
| / (slash) | Right | [1, 2, 3] |
| , (comma) | Left | [3, 2, 1] |
| . (period) | Right | [4, 5, 6] |
| ? (question mark) | Left | [6, 5, 4] |

Thus, it can be seen from the above description, a user of phone 100/100'/100"/100''' may advantageously use the key stroking based input facilities provided to enter alphanumeric data, commands and/or strings in a much more user friendly manner. The key stroking based input facilities are especially useful when working with "ancillary" functions of phone 100/100'/100"/100''', such as performing a name search, updating a phone directory or calendar, replying to an email, or browsing a web page.

Before further describing the present invention, it should be noted that the above described key stroking patterns of the various stroking directions are not necessarily the only key stroking patterns that can be recognized of the stroking directions. Further, the described stroking directions are not the only stroking directions that can be imparted either. The present invention may be practiced with additional key stroking patterns along the described stroking directions, as well as additional stroking directions. In particular, with additional key stroking patterns and/or directions, or combinations of the above described patterns (e.g. using the single button length stroking patterns (such as up [#]) as conjunctions to join the described patterns to form compound patterns (such as joining right [4, 5] and right [5, 6]), even more key stroking patterns may be formed.

Figure 2:
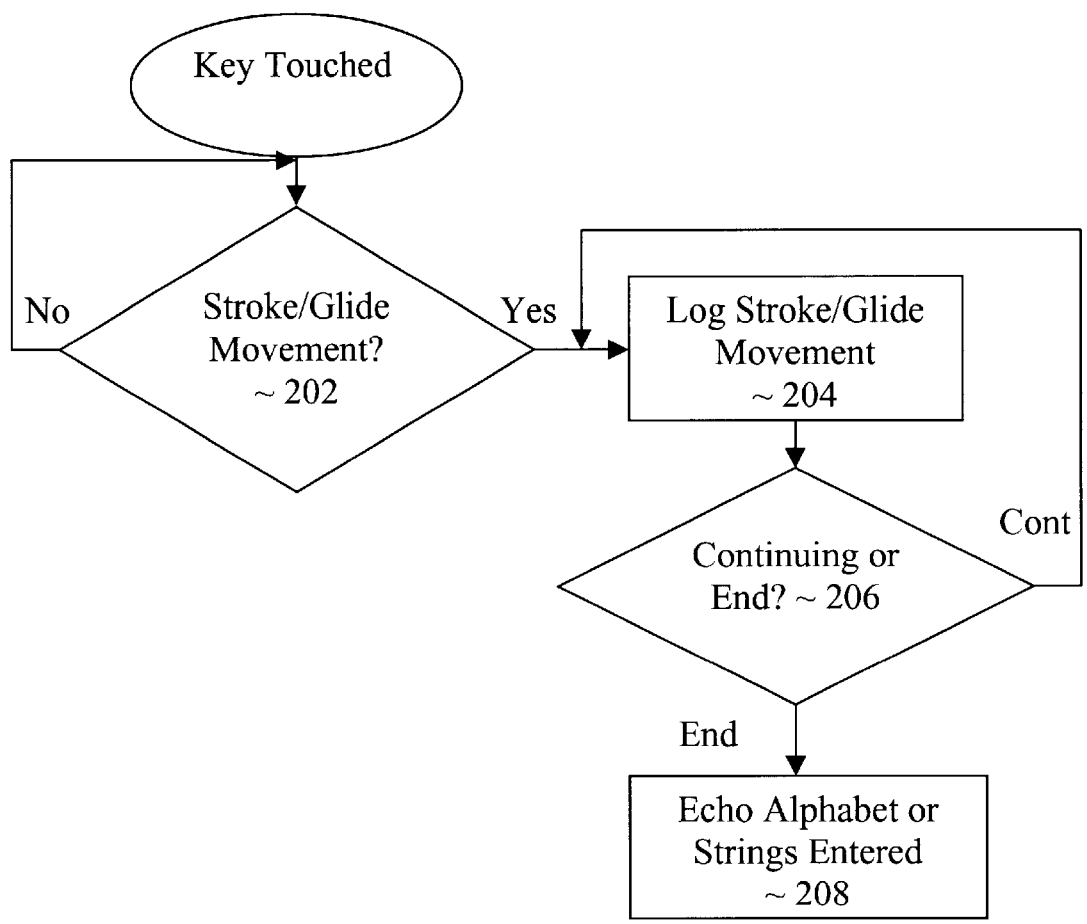
FIG. 2 illustrates the operational flow of the relevant aspects of the key stroking pattern logic provided to the wireless mobile phones of FIGS. 1a–1d, in accordance with one embodiment.

Referring now to FIG. 2, wherein the operational flow of the relevant aspects of the complementary logic is shown. As illustrated, during operation, upon start up, the complementary logic continuously monitors for the touching of a key of keypad 102/102'/102"/102''' denoting the potential start of a stroking pattern (or after a pause denoting completion of a previously completed stroking pattern). Upon detecting the touching of a key, the complementary logic monitors if the user begins to impart a stroking or gliding pattern, block 202. Upon detection of movement, the complementary logic logs or records the keys stroked or glided by the user (e.g. in a working buffer or other storage locations of phone 100/100'/100"/100'"), block 204. In one embodiment, the complementary logic further lights up the LEDs of the key touched by the user to provide feedback to the user.

Upon logging the key stroked (and optionally, lighting the key's LED), the complementary logic determines if the stroking continues or is terminated, block 206. If continuous movement is detected, the process returns to block 204. On the other hand, if cessation or termination of movement is detected, the process continues at block 208, where an alphabet, a punctuation, a command or a string corresponding to the sensed stroking or gliding pattern is considered entered, and its entry is simulated by the complementary logic. That is, the binary code representing the corresponding alphabet, punctuation, command or string is generated, and placed onto the input data path, as in devices where a user may employ a full keyboard to enter the alphabet, punctuation, command or string. Termination of a stroking or gliding pattern may be determined in accordance with a predetermined time interval, where no further movement is detected. In one embodiment, the complementary logic further causes the entered alphabet, punctuation, command or string to be echoed on display 108/108' of phone 100/100'/100"/100'".

In alternate embodiments, where compound stroking patterns (i.e. stroking patterns formed by joining the above described stroking patterns) are utilized, the complementary logic may determine if a stroking pattern is immediately followed by a stroking pattern (preferably of length one) designated as a conjunction, before concluding the entry of an "alphabet". If the stroking pattern is immediately followed by a "conjunction" stroking pattern, the complementary logic would interpret the two stroking patterns in combination (and not separately). To streamline operation, such additional decision making is made only if phone 100/100'/100"/100'" has been configured to support "compound stroking patterns", e.g. via a system profile setting.

Figure 3:
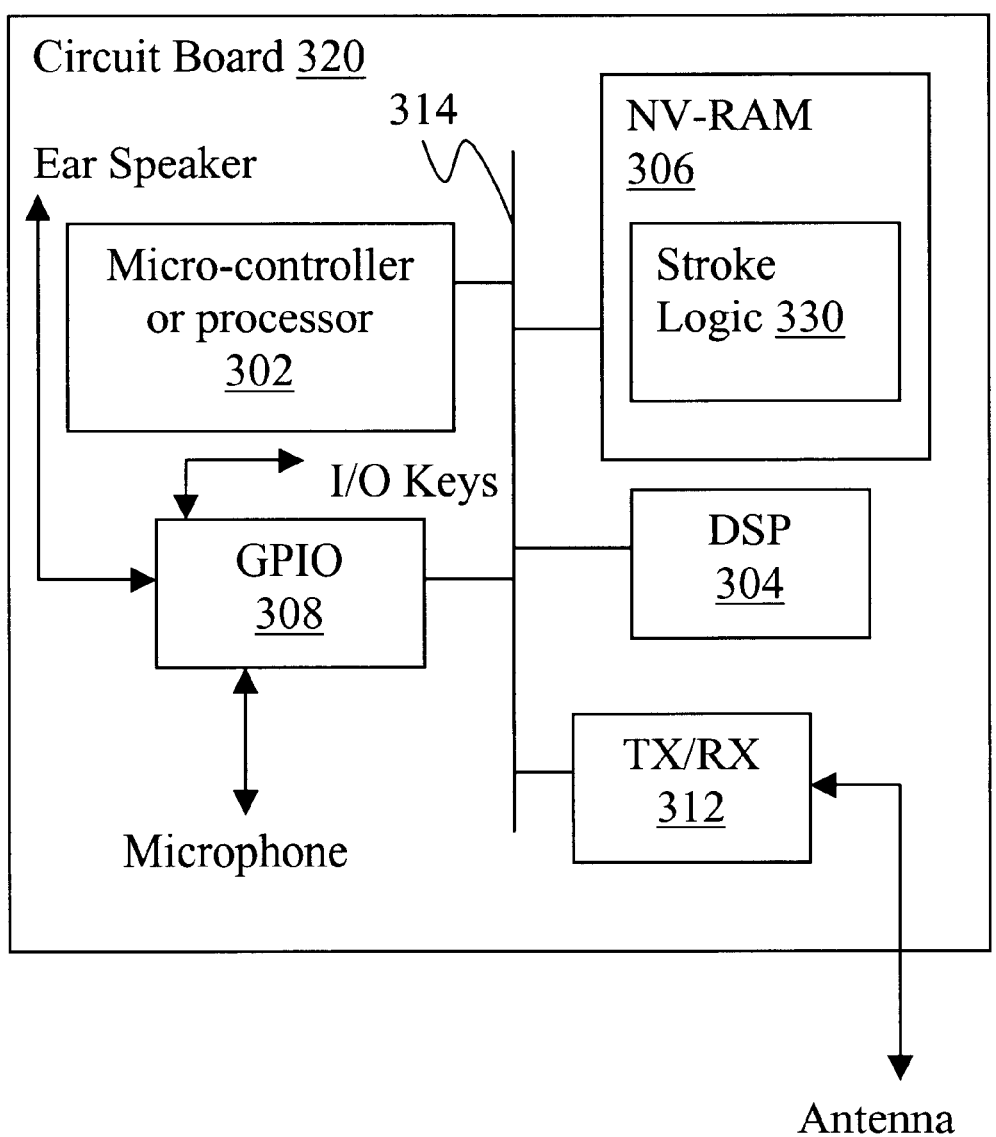
FIG. 3 illustrates an internal component view of the wireless mobile phones of FIGS. 1a–1d, in accordance with one embodiment.

FIG. 3 illustrates an architecture view of a wireless mobile phone 300, in accordance with one embodiment. As illustrated, wireless mobile phone 300 includes elements found in conventional mobile client devices, such as microcontroller/processor 302, digital signal processor (DSP) 304, non-volatile memory 306, general purpose input/output (GPIO) interface 308, transmit/receive (TX/RX) 312 (also referred to as a transceiver), coupled to each other via bus 314, and disposed on a circuit board 320. Except for the use of non-volatile memory 306 to host complementary logic 330, the elements are used to perform their conventional functions known in the art. In particular, TX/RX 312 may support one or more of any of the known signaling protocols, including but are not limited to CDMA, TDMA, GSM, and so forth. Their constitutions are known. Accordingly, the elements will not be further described.

Thus, a wireless mobile phone enhanced to enable its user to enter alphanumeric data, punctuations, commands, strings, and the like, through key stroking or gliding patterns has been described. While the present invention has been described in terms of the above illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A wireless mobile phone comprising:
    an input keypad having a plurality of touch sensitive keys; and
    means coupled to the input keypad to interpret key stroking patterns of said touch sensitive keys by a user to facilitate entry of alphanumeric data or commands, wherein each key stroking pattern is composed of one or more stroke pattern directions with each stroke pattern direction defined by a stroking of two or more adjacent ones of said touch sensitive keys.

2. The wireless mobile phone of claim 1, wherein said wireless mobile phone further comprises a transceiver to send and receive signals, including signals encoded with said alphanumeric data/commands entered through stroking of said touch sensitive keys.

3. The wireless mobile phone of claim 1, wherein said wireless mobile phone further comprises a display, and said means further echoes on said display said alphanumeric data entered through stroking of said touch sensitive keys.

4. The wireless mobile phone of claim 1, wherein said key stroking patterns include a downward stroking pattern where the user strokes two or more of said touch sensitive keys in a downward direction.

5. The wireless mobile phone of claim 1, wherein said key stroking patterns include an upward stroking pattern where the user strokes two or more of said touch sensitive keys in an upward direction.

6. The wireless mobile phone of claim 1, wherein said key stroking patterns include a right stroking pattern where the user strokes two or more of said touch sensitive keys in a rightward direction.

7. The wireless mobile phone of claim 1, wherein said key stroking patterns include a left stroking pattern where the user strokes two or more of said touch sensitive keys in a leftward direction.

8. The wireless mobile phone of claim 1, wherein said key stroking patterns include a down right stroking pattern where the user strokes a plurality of said touch sensitive keys first in a downward direction then in a rightward direction.

9. The wireless mobile phone of claim 1, wherein said key stroking patterns include a down left stroking pattern where the user strokes a plurality of said touch sensitive keys first in a downward direction then in a leftward direction.

10. The wireless mobile phone of claim 1, wherein said key stroking patterns include an up right stroking pattern where the user strokes a plurality of said touch sensitive keys first in an upward direction then in a rightward direction.

11. The wireless mobile phone of claim 1, wherein said key stroking patterns include an up left stroking pattern where the user strokes a plurality of said touch sensitive keys first in an upward direction then in a leftward direction.

12. The wireless mobile phone of claim 1, wherein said key stroking patterns include a right down stroking pattern where the user strokes a plurality of said touch sensitive keys first in a rightward direction then in a downward direction.

13. The wireless mobile phone of claim 1, wherein said key stroking patterns include a right up stroking pattern where the user strokes a plurality of said touch sensitive keys first in a rightward direction then in an upward direction.

14. The wireless mobile phone of claim 1, wherein said key stroking patterns include a left down stroking pattern where the user strokes a plurality of said touch sensitive keys first in a leftward direction then in a downward direction.

15. The wireless of keys of claim 1, wherein said key stroking patterns include a left up stroking pattern where the user strokes a plurality of said touch sensitive keys first in a leftward direction then in an upward direction.

16. The wireless mobile phone of claim 1, wherein said key stroking patterns include a diagonal stroking pattern where the user strokes a plurality of said touch sensitive keys in a top to bottom, left to right direction.

17. The wireless mobile phone of claim 1, wherein said key stroking patterns include a diagonal stroking pattern where the user strokes a plurality of said touch sensitive keys in a top to bottom, right to left direction.

18. The wireless mobile phone of claim 1, wherein said key stroking patterns include a diagonal stroking pattern where the user strokes a plurality of said touch sensitive keys in a bottom to top, left to right direction.

19. The wireless mobile phone of claim 1, wherein said key stroking patterns include a diagonal stroking pattern where the user strokes a plurality of said touch sensitive keys in a bottom to top, right to left direction.

20. The wireless mobile phone of claim 1, wherein said input keypad is a touch pad, and said touch sensitive keys are logically partitioned regions of said touch pad.

21. In a wireless mobile phone, a method of operation comprising:
    monitoring one or more of a user's key stroking patterns of touch sensitive keys of an input keypad, wherein each said key stroking pattern is composed of one or more stroke pattern directions with each stroke pattern direction defined by a stroking of two or more adjacent ones of said touch sensitive keys; and
    in response, determining alphanumeric data or commands corresponding to the stroking pattern, and generating digital representations of the determined alphanumeric data/commands.

22. The method of claim 21, wherein said method further comprises transmitting said alphanumeric data/commands.

23. The method of claim 21, wherein said method further comprises visually echoing on a display, said alphanumeric data.

24. The method of claim 21, wherein said key stroking patterns include a downward stroking pattern where the user strokes two or more of said touch sensitive keys in a downward direction.

25. The method of claim 21, wherein said key stroking patterns include an up stroking pattern where the user strokes two or more of said touch sensitive keys in an upward direction.

26. The method of claim 21, wherein said key stroking patterns include a right stroking pattern where the user strokes two or more of said touch sensitive keys in a rightward direction.

27. The method of claim 21, wherein said key stroking patterns include a left stroking pattern where the user strokes two or more of said touch sensitive keys in a leftward direction.

28. The method of claim 21, wherein said key stroking patterns include a down right stroking pattern where the user strokes a plurality of said touch sensitive keys first in a downward direction then in a rightward direction.

29. The method of claim 21, wherein said key stroking patterns include a down left stroking pattern where the user strokes a plurality of said touch sensitive keys first in a downward direction then in a leftward direction.

30. The method of claim 21, wherein said key stroking patterns include an up right stroking pattern where the user strokes a plurality of said touch sensitive keys first in an upward direction then in a rightward direction.

31. The method of claim 21, wherein said key stroking patterns include an up left stroking pattern where the user strokes a plurality of said touch sensitive keys first in an upward direction then in a leftward direction.

32. The method of claim 21, wherein said key stroking patterns include a right down stroking pattern where the user strokes two or more of said touch sensitive keys first in a rightward direction then in a downward direction.

33. The method of claim 21, wherein said key stroking patterns include a right up stroking pattern where the user strokes two or more of said touch sensitive keys first in a rightward direction then in an upward direction.

34. The method of claim 21, wherein said key stroking patterns include a left down stroking pattern where the user strokes a plurality of said touch sensitive keys first in a leftward direction then in a downward direction.

35. The method of claim 21, wherein said key stroking patterns include a left up stroking pattern where the user strokes a plurality of said touch sensitive keys first in a leftward direction then in an upward direction.

36. The method of claim 21, wherein said key stroking patterns include a diagonal stroking pattern where the user strokes a plurality of said touch sensitive keys in a top to bottom, left to right direction.

37. The method of claim 21, wherein said key stroking patterns include a diagonal stroking pattern where the user strokes a plurality of said touch sensitive keys in a top to bottom, right to left direction.

38. The method of claim 21, wherein said key stroking patterns include a diagonal stroking pattern where the user strokes a plurality of said touch sensitive keys in a bottom to top, left to right direction.

39. The method of claim 21, wherein said key stroking patterns include a diagonal stroking pattern where the user strokes a plurality of said touch sensitive keys in a bottom to top, right to left direction.

40. The method of claim 21, wherein said input keypad is a touch pad, and said touch sensitive keys are logically partitioned regions of said touch pad; further, said monitoring comprises monitoring stroking of said logically partitioned regions of said touch pad.

41. A wireless mobile phone comprising:
    an input keypad having a plurality of physical touch sensitive keys, each having one or more light emitting diodes (LED); and
    means coupled to the input keypad to interpret key stroking patterns of said touch sensitive keys by a user to facilitate entry of alphanumeric data or commands, wherein said means further lights said LEDs of said touch sensitive keys to visually echo the key stroking patterns being imparted by a user of said wireless mobile phone.

42. In a wireless mobile phone, a method of operation comprising:
    monitoring one or more of a user's key stroking patterns of physical touch sensitive keys of an input keypad, each of said touch sensitive keys having one or more light emitting diodes (LED); and
    in response, determining alphanumeric data or commands corresponding to the stroking pattern, generating digital representations of the determined alphanumeric data/commands, and lighting said LEDs of said touch sensitive keys to visually echo an observed key stroking pattern.

43. In a wireless mobile phone, a method of operation comprising:
    performing a first operation associated with an ancillary function of said wireless mobile phone including entry of a first data or command by imparting a first stroking pattern of one or more touch sensitive keys of an input keypad of said wireless mobile phone; and performing a second operation associated with said ancillary function of said wireless mobile phone including entry of a second data or command by imparting a second stroking pattern of one or more touch sensitive keys of said input keypad of said wireless mobile phone, wherein at least one of said first and second stroking patterns is composed of one or more stroke pattern directions with each stroke pattern direction defined by a stroking of two or more adjacent ones of said touch sensitive keys.

44. The method of claim 43, wherein the method further comprises:

performing a second operation associated with a second ancillary function of said wireless mobile phone including entry of a second data or command by imparting a second stroking pattern of one or more touch sensitive keys of said input keypad of said wireless mobile phone.

45. The method of claim 43, wherein said ancillary function is a selected one of telephone directory, calendar, email and web browsing function.

46. A wireless mobile phone comprising:

an input keypad having a plurality of touch sensitive keys; and a micro-controller and associated memory, including programming instructions stored therein, coupled to the input keypad to interpret stroking patterns of said touch sensitive keys by a user to facilitate entry of alphanumeric data or commands, wherein at least one of said first and second stroking patterns is composed of one or more stroke pattern directions with each stroke pattern direction defined by a stroking of two or more adjacent ones of said touch sensitive keys.

47. In a wireless mobile phone, a method of operation comprising:

monitoring one or more of a user's key stroking patterns of physical touch sensitive keys of an input keypad, each of said touch sensitive keys having one or more light emitting diodes (LED); and in response, lighting said LEDs of said touch sensitive keys to visually echo an observed key stroking pattern.

* * * * *

UNITED STATES PATENT AND TRADEMARK OFFICE
CERTIFICATE OF CORRECTION

PATENT NO. : 6,952,597 B2 Page 1 of 1
APPLICATION NO. : 09/767197
DATED : October 4, 2005
INVENTOR(S) : Tyrol R. Graham and G. Eric Engstrom It is certified that error appears in the above-identified patent and that said Letters Patent is hereby corrected as shown below:

Column 3
Line 13, "...using anyone of..." should read --...using any one of...--.
Line 40, "Beside touch sensitive..." should read --...() Beside touch sensitive...--.
Line 65, "...keypad 102'/102'..." should read --...keypad 102'/102'''...--.

Column 4
Line 12, "...so forth. A "down" row..." should read --...so forth. As summarized in the "down" row...--.

Column 5
Line 13, "...[#0,*,7], and..." should read --...[#,0,*,7], and...--.
Line 15, "...[*0,#,9]..." should read --...[*,0,#,9]...--.

Signed and Sealed this

Fifth Day of June, 2007

JON W. DUDAS
*Director of the United States Patent and Trademark Office*